Sept. 19, 1967 J. M. FORNEY 3,342,928
SPLICE CLOSURES
Filed July 6, 1965

INVENTOR
J. M. FORNEY
BY Leo Stanger
ATTORNEY

United States Patent Office 3,342,928
Patented Sept. 19, 1967

3,342,928
SPLICE CLOSURES
James M. Forney, Cincinnati, Ohio, assignor to American Telephone and Telegraph Company, New York, N.Y., a corporation of New York
Filed July 6, 1965, Ser. No. 469,514
8 Claims. (Cl. 174—88)

ABSTRACT OF THE DISCLOSURE

For protecting a splice bundle that joins the conductors of multicoaxial lead-sheathed cable lengths, a steel sleeve coated with consecutive layers of copper, tin, and tin-lead surrounds the splice bundle. Embracing the respective ends of the sleeve are two collars of lead soldered to the sleeve and extending beyond the sleeve edges. The lead collars are beaten in and soldered against lead end plates that extend radially from the lead sheath on the cable lengths.

---

This invention relates to splice closures, particularly, although not exclusively, for protecting splices that join lengths of underground multicoaxial communication cables.

Such cables are generally subjected to internal gas pressure for preventing ingress of underground vapor or water. Lead sheaths cover the cables to provide a somewhat flexible hermetic barrier against the efflux of gas and the entry of vapor. To retain the moisture barrier throughout the cable, splices joining cable lengths of this type are jacketed in lead closures capable of withstanding the internal gas pressures in the cables. Such lead closures covering the splices must of course be larger than the lead sheaths on the cables. This is particularly so where the cable comprises many coaxials and every cable splice actually constitutes a bundle of individual coaxial splices.

Lead splice closures serve excellently as protection for splice bundles joining lengths of cable carrying eight or twelve coaxials. However, for larger cables such as twenty-coaxial cables, the splice closures are heavy enough to become a safety hazard during installation. This is so because during installation the heavy closures must often be handled and carried by personnel on uncertain and muddy terrain inaccessible to vehicles and machinery.

Moreover, on so-called "hardened" cable routes the lead closures enclose inner steel liners to protect them from overpressure due to nearby blasts or explosions. Thus frequently, application of a closure about a splice involves the dangerous situation of a workman standing in a muddy pit receiving a 140-pound lead closure member that is being lowered to him.

An object of this invention is to improve such splice closures.

Another object of this invention is to make such splice closures safer by decreasing their weight.

Still another object of the invention is to lighten such splice closures without subjecting them to vapor or moisture leakage or rupture due to nearby blasts or explosions.

According to the invention a splice closure is formed by surrounding a cable splice with a steel sleeve electrolytically plated with a layer of copper, a layer of tin, and a layer of tin-lead and carrying on its ends two collars of lead that are soldered to the coated steel sleeve and extend beyond the sleeve edges. Preferably the lead collars are beaten in and soldered against appropriate end plates that extend radially from the lead sheath on the lengths of cable being spliced.

Figure 1:
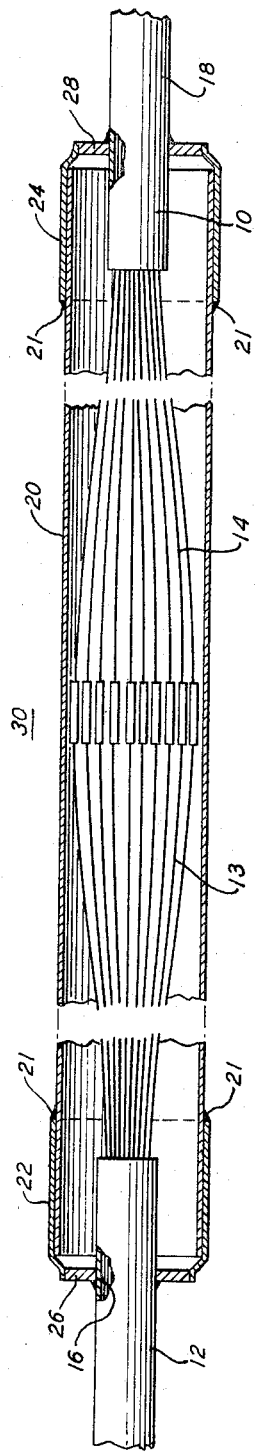
Figure 2:
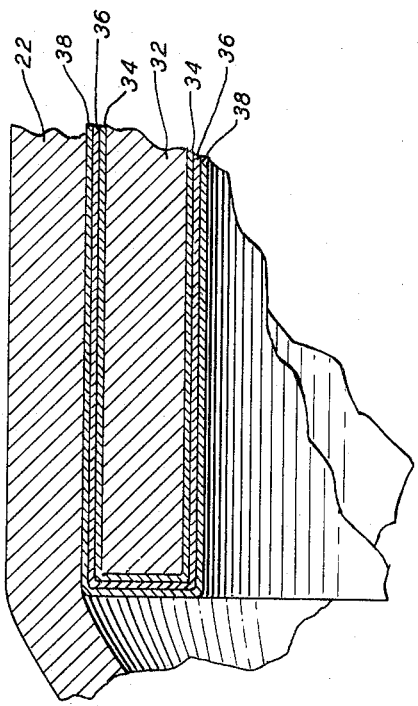

These and other features of the invention are pointed out particularly in the claims forming a part of this specification. Other objects and advantages of the invention will become obvious from the following detailed description when read in light of the accompanying drawing, wherein:

FIG. 1 is a cross-sectional, partly schematic, view illustrating an enclosed splice embodying features of the invention; and FIG. 2 is a cross-sectional detail of a portion of the closure in FIG. 1.

In FIG. 1 the ends of two lengths 10 and 12 of cables each carrying twenty coaxials 13 join to form a splice bundle 14 composed of twenty individual coaxial splices 15. The lengths 10 and 12 carry respective outer jackets 16 and 18 made of lead. A steel sleeve 20 coated with successive layers of copper, tin, and lead-tin surrounds the splice bundle 14 and projects over the ends of the cable lengths 10 and 12. Two lead collars 22 and 24 secured to the sleeve 20 with solder fillets 21 project beyond the ends of the sleeve 20 and converge inwardly around two end plates 26 and 28. The latter project radially from the lead sheaths 16 and 18 on the lengths 10 and 12 to which they are soldered. The end plates 26 and 28 are soldered to the collars 22 and 24 to form the splice case generally designated 30.

FIG. 2 is a sectional detail of a portion of sleeve 20 and the collar 22. The sleeve 20 comprises a steel base 32 of cylindrical shape having a copper plate 34 on both inside and outside. Surrounding the copper plate is a layer 36 of tin which in turn is surmounted by a layer of tin-lead plate 38. The collars 22 and 24 are thus soldered to the tin-lead plate 38. For clarity the thicknesses of the layer 36 and plates 34 and 38 are exaggerated.

In operation, the splice cases 30 are prefabricated in a shop for use by field personnel. Their dimensions are variable. However, for clarity the following discussion includes some examples of dimensions suitable for use with twenty-coaxial cable. The prefabrication of case 30 involves first degreasing the steel cylinder 20 (13 gage, 6.75 outer diameter, 38 inches long) with trichlorethylene and then reverse-current cleaning the sleeve in an Anodex cleaner at 180° F. to 200° F. The steel is then pickled in a 50 percent hydrochloric acid solution. The process continues by copper striking the steel base 32, copper plating the steel for five minutes to form the plate 34, and then tin plating the copper by dipping to form layer 36. The tin-lead layer 38 is then plated over the tin layer 36.

In the shop the two collars 22 and 24 of extra-strength lead sleeving large enough to slide over the sleeve 20 (7 inches inner diameter, 8 inches long) are then cut and soldered around each end of the sleeve so that one inch of the lead collars protrude beyond each end of the sleeve 20. The entire structure of sleeve 20 and collars 22 and 24 is then transported to the field where the splice is to be enclosed.

Before the splice bundle 14 is formed to join the lengths 10 and 12, a workman slips the end plates 26 and 28 (6½ inches outer diameter) over the respective ends of lengths 10 and 12 (2.88 inches outer diameter). Also before proceeding with the splice the slides the sleeve 20 with collars 22 and 24 over one of the lengths 10 or 12. The splices bundle 14 is then formed. The workman slips the sleeve 20 over the bundle 14 so that the sleeve overlaps the ends of the lengths 10 and 12. The tack solders the end plates 26 and 28 into positions just inside the outer ends of the collars 22 and 24. The collars are mechanically closed onto the end plates 26 and 28 by a process called "beating-in." This involves radially beating the ends of the collars 22 with a mallet until the collars 22 and 24 firmly embrace the peripheries of the end plates 26 and 28. Such beating-in is well known in the art of splice closures and takes advantage of the malleable properties of lead. Preferably it is also used to help secure the collars 26 and 28 onto the sleeve 20 during prefabrication.

The entire closure 30 is hermetically sealed and completed by flowing molten solder around the joints formed between the jackets 16 and 18, the end plates 26 and 28, the collars 22 and 24, and the sleeve 20 and then wiping the solder. This technique is known as solder wiping. This repeated flowing of solder heats the members 16, 18, 26, 28, 22, 24, and 20 until the latter is hot enough to produce a firm solder joint filled in all interstices with solder. The collars 24 and 26 are each long enough so that the heat will not loosen the joints 21.

A low-melting-point bismuth-solder compound is applied to the still hot surfaces to fill the smallest interstices.

Splice closures according to FIGS. 1 and 2 possess the percussion-resistant and blast-resistant properties necessary for protection against nearby explosions that could be expectable from a lead closure lined with steel. They also exhibit the leak-free hermetically sealed properties of the all-lead closure. Nevertheless, these closures weigh only about one-half as much as lead closures of comparable size. For example, a 40-inch long, 7-inch-diameter lead splice closure lined with a 36-inch long, 6-inch-diameter steel liner, constructed according to previous standards, weighs 131 pounds. On the other hand, splice closures of comparable size, constructed according to the invention, hardly reach 70 pounds. The new cable also represents a considerable saving in material costs.

Reducing the weight of previously cumbersome splice closures is a great aid to safety during cable installation. The splice closure must frequently be carried from a truck on uncertain terrain and lowered to the installer, who may be working in a muddy pit.

While an embodiment of the invention has been described in detail, it will be obvious to those skilled in the art that the invention may be practiced otherwise without departing from its spirit and scope.

What is claimed is:

1. A splice closure enclosing a splice that joins coaxial conductors of two lengths of lead-jacketed cable, comprising sleeve means surrounding the splice and including a steel cylinder having a lead alloy layer substantially thinner than the steel cylinder and bonded to its inner and outer surfaces, two disc-shaped end plates each having a center hole and embracing the jacket on one of said cable lengths, said end plates having a substantially lead composition and extending radially from said jacket, two mutually separated collar means composed substantially of lead extending from respective ends of said sleeve and surrounding respective ones of said end plates, and solder joining said collar means to said sleeve and said end plates in hermetically tight seals and joining said end plates to said jacket in hermetically tight seals.

2. A splice closure enclosing a splice that joins coaxial conductors of two lengths of lead-jacketed cable, comprising sleeve means surrounding the splice and including a steel cylinder having a lead alloy layer substantially thinner than the steel cylinder and bonded to its inner and outer surfaces, a copper layer and a tin layer between said steel base and said lead alloy layer, two disc-shaped end plates each having a center hole and embracing the jacket on one of said cable lengths, said end plates having a substantially lead composition and extending radially from said jacket, two mutually separated collar means composed substantially of lead extending from respective ends of said sleeve and surrounding respective ones of said end plates, and solder joining said collar means to said sleeve and said end plates in hermetically tight seals and joining said end plates to said jacket in hermetically tight seals.

3. A splice closure enclosing a splice that joins coaxial conductors of two lengths of lead-jacketed cable, comprising sleeve means surrounding the splice and including a steel cylinder having a lead alloy layer substantially thinner than the steel cylinder and bonded to its inner and outer surfaces, two disc-shaped end plates each having a center hole and embracing the jacket on one of said cable lengths, said end plates having a substantially lead composition and extending radially from said jacket, two mutually separated collar means composed substantially of lead embracing said sleeve means at respective ends and extending beyond said sleeve means, said collar means embracing said end plates and solder joining said collar means to said sleeve and said end plates in hermetically tight seals and joining said end plates to said jacket in hermetically tight seals.

4. A splice closure enclosing a splice that joins coaxial conductors of two lengths of lead-jacketed cable, comprising sleeve means surrounding the splice and including a steel cylinder having a lead alloy layer substantially thinner than the steel cylinder and bonded to its inner and outer surfaces, a copper layer and a tin layer between said steel base and said lead alloy layer, two disc-shaped end plates each having a center hole and embracing the jacket on one of said cable lengths, said end plates having a substantially lead composition and extending radially from said jacket, two mutually separated collar means composed substantially of lead embracing said sleeve means at respective ends and extending beyond said sleeve means, said collar means embracing said end plates, and solder joining said collar means to said sleeve and said end plates in hermetically tight seals and joining said end plates to said jacket in hermetically tight seals.

5. A cable splice, comprising two cable sections each having a plurality of conductors mounted therein and having jackets made substantially of lead, a plurality of splices joining respective conductors in the cables to each other and forming a splice bundle, a sleeve surrounding said splice bundle and including a steel cylinder having a lead-alloy layer substantially thinner than said cylinder and bonded to its outer and inner surfaces, two disc-shaped end plates each having a center hole and embracing the jackets on respective ones of said cable sections, said end plates having a lead composition and extending radially from said jackets, two mutually separated collar means composed substantially of lead extending from respective ends of said sleeve and surrounding respective ones of said end plates, said collar means each being shorter than the longitudinal distance between them, and solder joining said collar means to said sleeve and said end plates and joining said end plates to said jackets in hermetically tight seals.

6. A cable splice, comprising two cable sections each having a plurality of conductors mounted therein and having jackets made substantially of lead, a plurality of splices joining respective conductors in the cables to each other and forming a splice bundle, a sleeve surrounding said splice bundle and including a steel cylinder having a lead alloy layer substantially thinner than said cylinder and bonded to its outer and inner surfaces, a copper layer and a tin layer between said steel base and said lead alloy layer, two disc-shaped end plates each having a center hole and embracing the jackets on respective ones of said cable sections, said end plates having a lead composition and extending radially from said jackets, two mutually separated collar means composed substantially of lead extending from respective ends of said sleeve and surrounding respective ones of said end plates, said collar means each being shorter than the longitudinal distance between them, and solder joining said collar means to said sleeve and said end plates and joining said end plates to said jackets in hermetically tight seals.

7. A cable splice, comprising two cable sections each having a plurality of cable coaxials mounted therein and having jackets made substantially of lead, a plurality of splices joining respective coaxials in the cables to each other and forming a splice bundle, a sleeve surrounding said splice bundle and including a steel cylinder having a lead alloy layer substantially thinner than said cylinder and bonded to its outer and inner surfaces, two disc-shaped end plates each having a center hole and embracing the jackets on respective ones of said cable sections, said end plates having a lead composition and extending radially from said jackets, two mutually separated collar means composed substantially of lead extending from respective ends of said sleeve and surrounding respective ones of said end plates, said collar means each being shorter than the longitudinal distance between them and extending beyond the end of said sleeve, and solder joining said collar means to said sleeve and said end plates and joining said end plates to said jackets in hermetically tight seals.

8. A cable splice portion, comprising two cable sections each having a plurality of cable coaxials mounted therein and having jackets made substantially of lead, a plurality of splices joining respective coaxials in the cables to each other and forming a splice bundle, a sleeve surrounding said splice bundle and including a steel cylinder having a lead alloy layer substantially thinner than said cylinder and bonded to its outer and inner surfaces, a copper layer and a tin layer between said steel base and said lead alloy layer, two disc-shaped end plates each having a center hole and embracing the jackets on respective ones of said cable sections, said end plates having a lead composition and extending radially from said jackets, two mutually separated collar means composed substantially of lead extending from respective ends of said sleeve and surrounding respective ones of said end plates, said collar means each being shorter than the longitudinal distance between them and extending beyond the end of said sleeve, and solder joining said collar means to said sleeve and said end plates and joining said end plates to said jackets in hermetically tight seals.

No references cited.

DARRELL L. CLAY, *Primary Examiner.*